United States Patent [19]
Kubota

[11] Patent Number: 5,679,440
[45] Date of Patent: Oct. 21, 1997

[54] OPTICAL CARD

[75] Inventor: Takeshi Kubota, Tokyo-to, Japan

[73] Assignee: Dai Nippon Printing Co., Ltd., Japan

[21] Appl. No.: 408,602

[22] Filed: Mar. 23, 1995

[30] Foreign Application Priority Data

Mar. 25, 1994 [JP] Japan .................... 6-077899

[51] Int. Cl.⁶ .................................................. B32B 3/00
[52] U.S. Cl. ................ 428/195; 428/200; 428/209; 428/694 ML; 428/913; 430/270.11; 430/945; 369/283; 369/288
[58] Field of Search .................. 428/64.1, 64.2, 428/64.4, 64.5, 64.6, 65.2, 913, 195, 200, 209, 694 ML; 430/270.1, 270.11, 495.1, 945; 369/283, 288

[56] References Cited

U.S. PATENT DOCUMENTS

| | | | |
|---|---|---|---|
| 4,849,618 | 7/1989 | Namikawa et al. | 235/493 |
| 5,034,081 | 7/1991 | Aizawa et al. | 156/220 |
| 5,059,462 | 10/1991 | Kurisu et al. | 428/64 |
| 5,224,090 | 6/1993 | Umeda et al. | 369/284 |
| 5,297,132 | 3/1994 | Takano et al. | 369/284 |
| 5,356,717 | 10/1994 | Choki et al. | 428/425.9 |

*Primary Examiner*—Elizabeth Evans
*Attorney, Agent, or Firm*—Parkhurst, Wendel & Burr, L.L.P.

[57] ABSTRACT

The present invention provides an optical card which has an excellent suitability for embossing, i.e., causes neither warpage of the card nor cracking of the transparent protective layer upon application of pressure during embossing. The optical card includes a card substrate, an adhesive layer provided on one surface of the card substrate, an optical recording material layer provided on the surface of the adhesive layer, and a transparent protective layer optionally provided on the surface of the optical recording material layer. The optical recording material layer has an emboss area, to be embossed, provided in areas other than an optical recording section of the optical recording material layer. The adhesive layer comprises an adhesive having, in the form of a film, a breaking strength of not less than 50 kg/cm² and an elongation at break of not more than 600%.

18 Claims, 11 Drawing Sheets

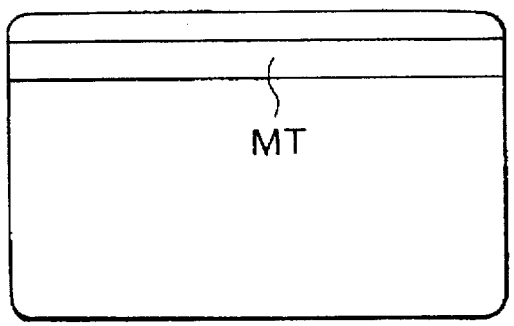
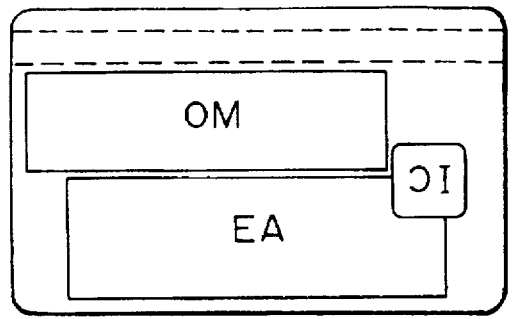
FIG. 5A        FIG. 5B
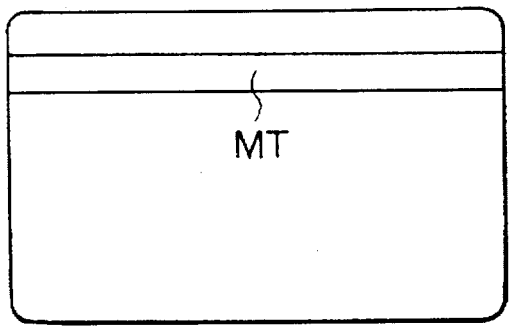
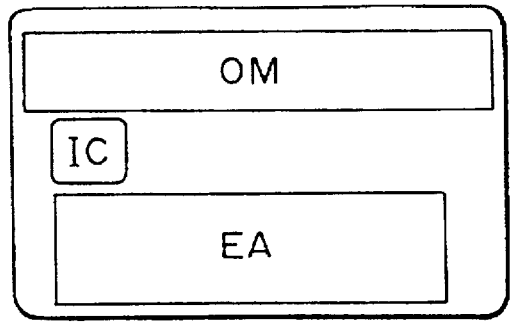
FIG. 6A        FIG. 6B
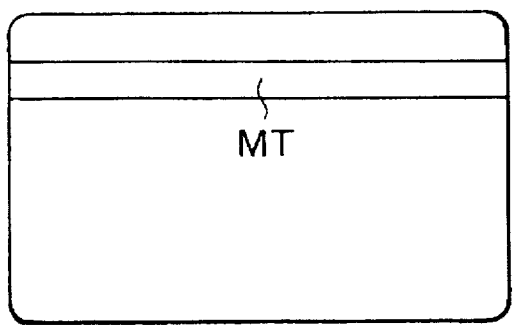
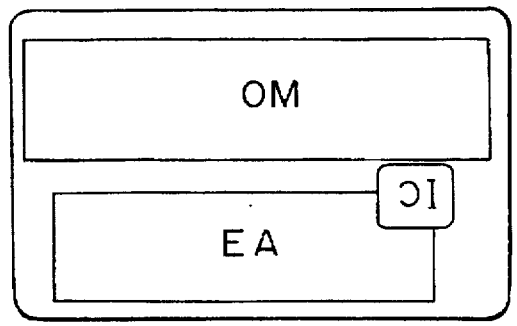
FIG. 7A        FIG. 7B

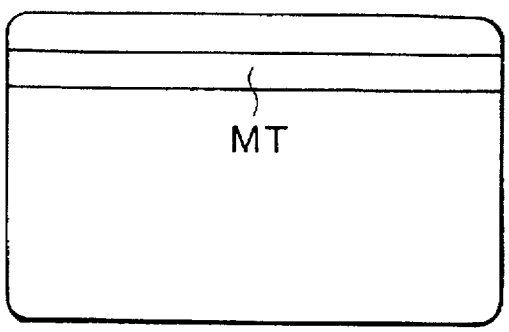
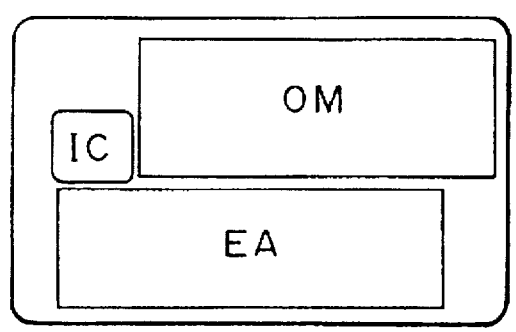
FIG. 8A FIG. 8B
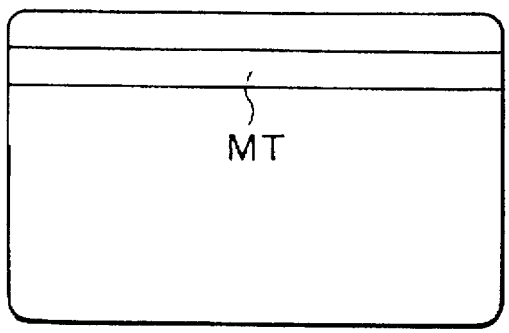
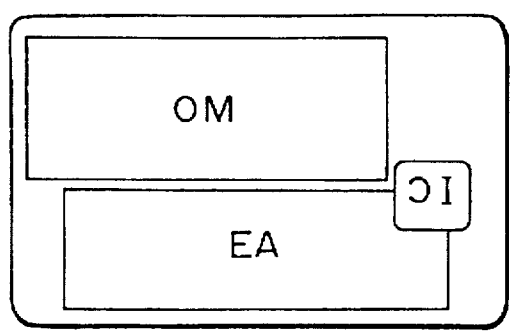
FIG. 9A FIG. 9B
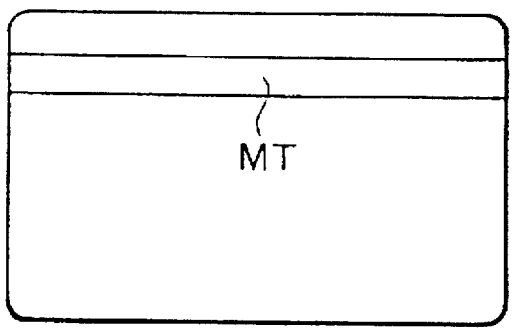
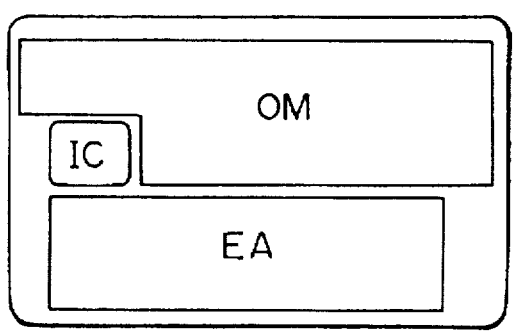
FIG. 10A FIG. 10B

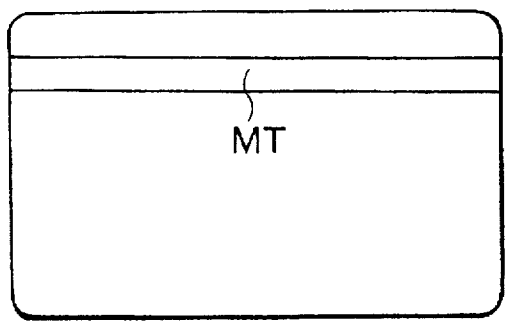
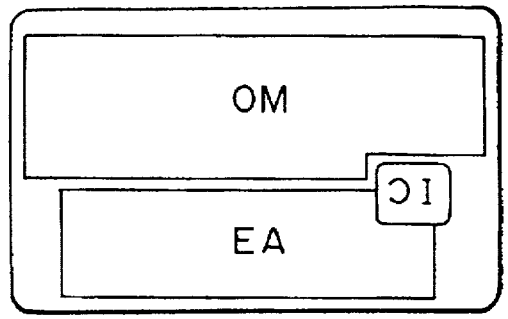
FIG. 11A                FIG. 11B
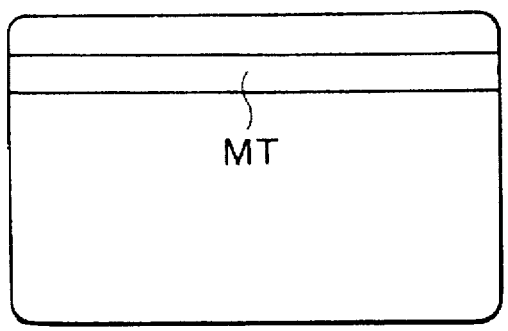
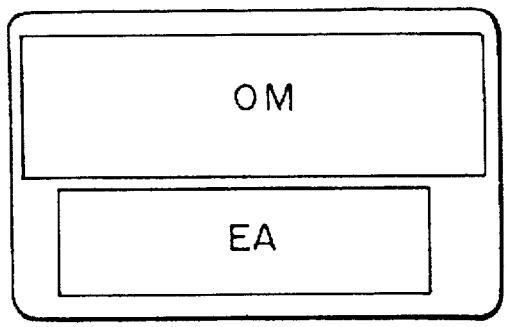
FIG. 12A                FIG. 12B
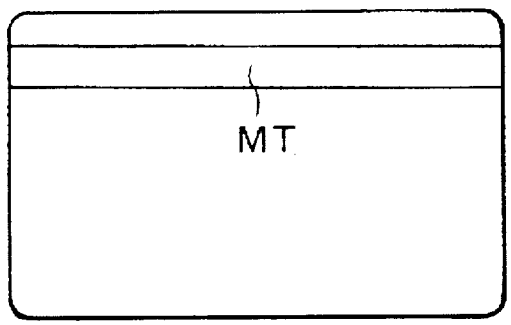
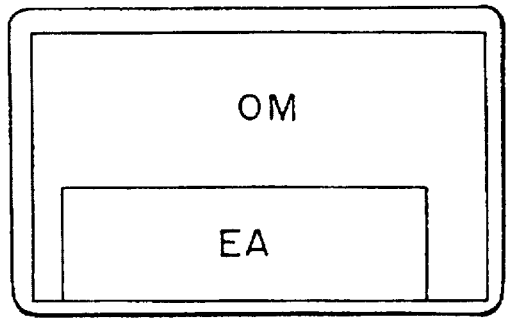
FIG. 13A                FIG. 13B

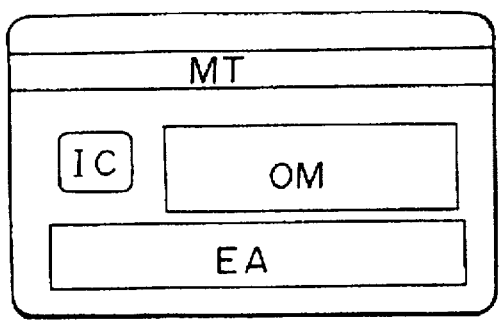
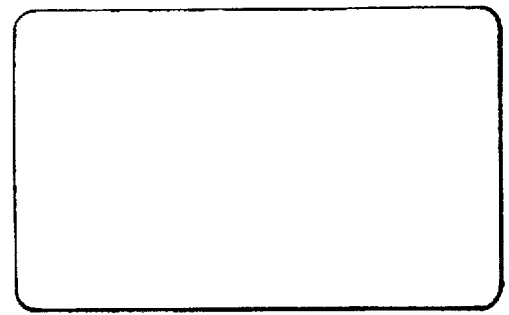
FIG. 14A    FIG. 14B
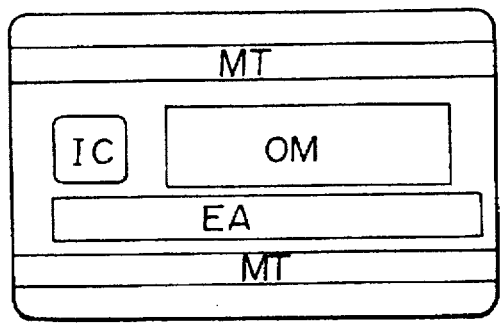
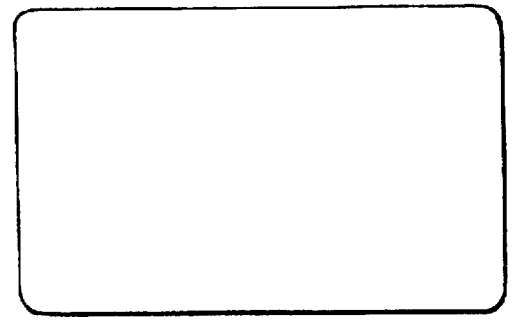
FIG. 15A    FIG. 15B
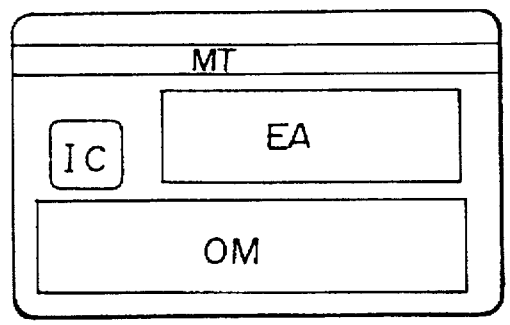
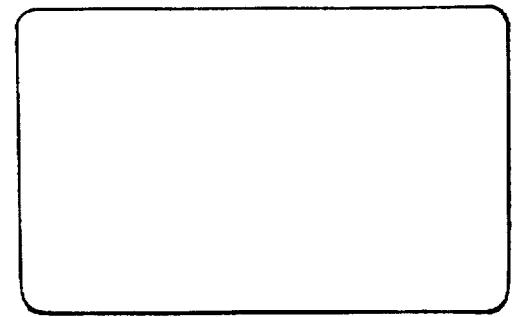
FIG. 16A    FIG. 16B

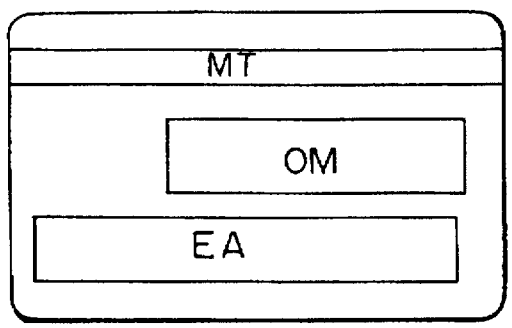
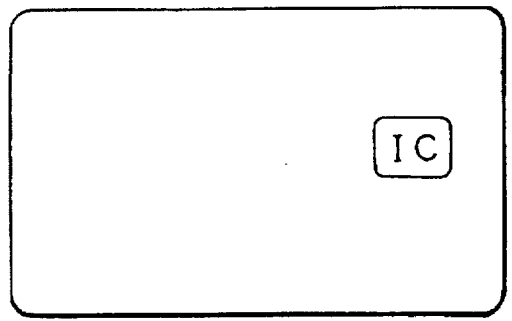
FIG. 20A               FIG. 20B
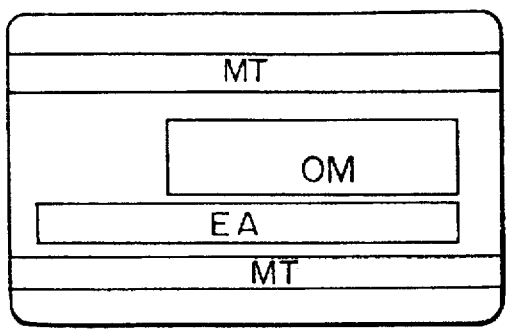
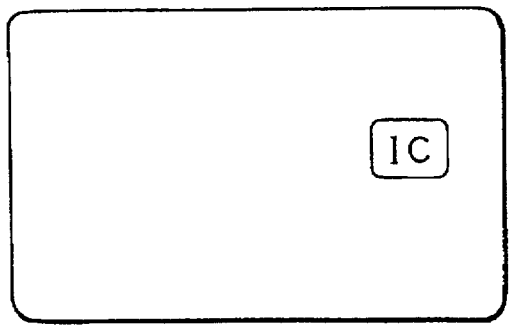
FIG. 21A               FIG. 21B
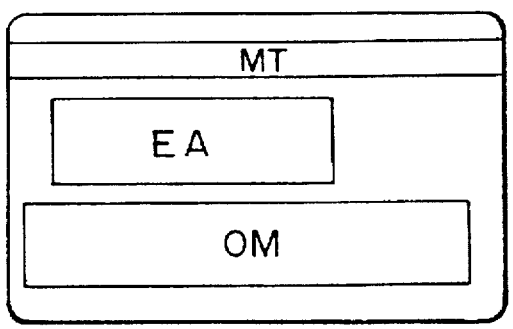
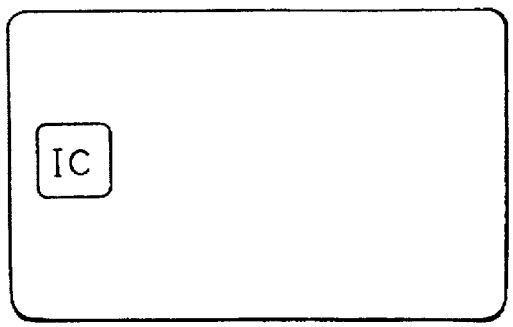
FIG. 22A               FIG. 22B

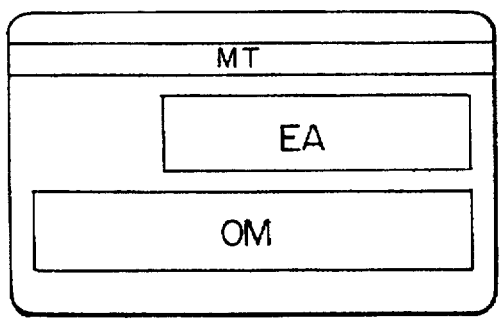
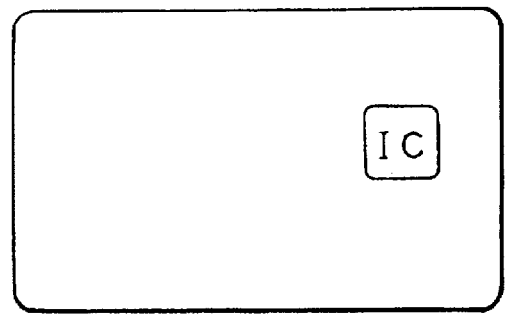
FIG. 23A         FIG. 23B
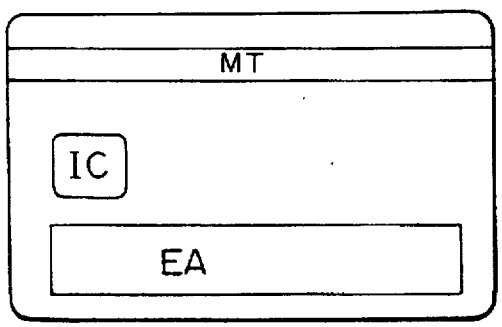
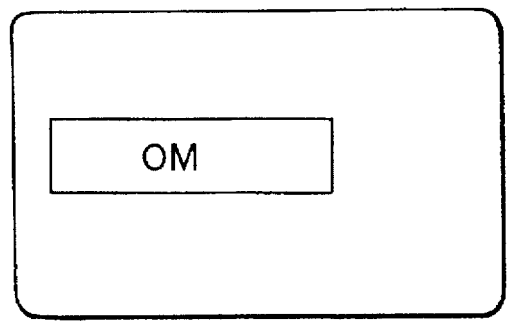
FIG. 24A         FIG. 24B
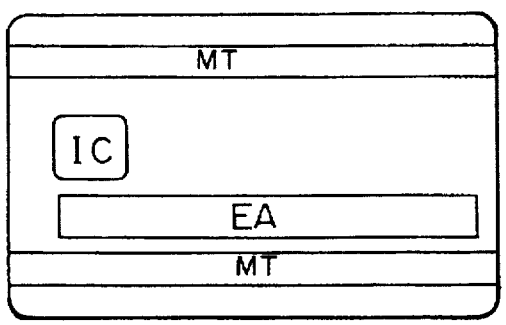
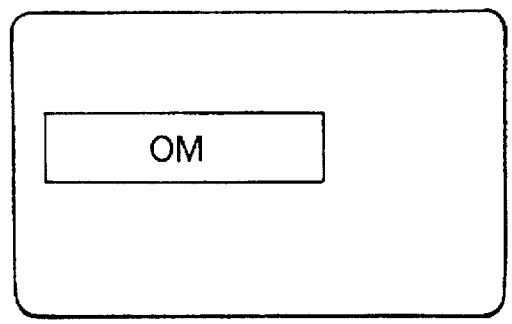
FIG. 25A         FIG. 25B

OPTICAL CARD

BACKGROUND OF THE INVENTION

The present invention relates to an optical card for use in credit cards, debit cards, cards for medical data, and the like.

An optical card known in the art, which is an optical memory card comprising a plastic card with a built-in information recording section, is described, for example, in Japanese Patent Laid-Open No. 20511/1993. As shown in FIG. 28, this optical card C has the following structure. An optical recording material layer 12 constituting a light recording section is formed on one side of a light-permeable pattern layer 11. A card substrate 14 is laminated onto the surface of the optical recording material layer 12 through an adhesive layer 13, and a transparent protective layer 15 and a surface hardening layer 16 are laminated in that order onto the surface of the pattern layer 11 remote from the optical recording material layer 12. In the optical card shown in the drawing, the card substrate 14 has a three-layer structure of a laminate of a transparent oversheet 14a formed of polyvinyl chloride, an opalescent core sheet 14b formed of polyvinyl chloride, and a transparent oversheet 14c formed of polyvinyl chloride. Print layers 17a and 17c are provided on respective both sides of the core sheet 14b.

Magnetic cards and IC cards generally have an emboss of characters representing information on the cards, such as personal name and registration number. Embossing for providing the above emboss of characters is to produce a relief of characters on the surface of a card through the action of pressure. The relief can be colored to facilitate confirmation of the information on the card with the naked eye, and, in addition, the embossed card can be used as a plate for transferring the information on the card onto a different medium, such as paper, by taking advantage of the relief. For the above conventional optical cards, however, the surface thereof cannot be properly embossed. Specifically, when embossing is carried out on an emboss area provided in a portion other than the optical recording section, pressure applied during embossing causes large permanent warpage of the card. This in turn causes problems including that the permanent warpage makes it impossible to record and reproduce information in the optical recording section and cracking occurs in a transparent protective layer for protecting the optical recording section, again making it difficult to record and reproduce information. The creation of the permanent warpage is attributable to the following fact. In the optical card, an adhesive layer is generally in direct contact with the optical recording section, and there is a tendency for the recording sensitivity to become better with increasing the softness of the adhesive to some extent, leading to a tendency of a soft adhesive to be used for taking precedence of the sensitivity.

For this reason, the optical card has hitherto been regarded as unsuitable for embossing.

DISCLOSURE OF INVENTION

The present invention has been made under the above circumstances, and an object of the present invention is to provide an optical card which has an excellent suitability for embossing, i.e., causes neither warpage of the card nor cracking of the transparent protective layer upon application of pressure during embossing.

The present inventors have made extensive studies with a view to attaining the above object and, as a result, have found that properties regarding hardness among properties of an adhesive used mainly in an adhesive layer have a great effect on the suitability of the card for embossing, which has led to the completion of the present invention.

Specifically, the present inventors have carried out various tests based on estimation that the hardness of the adhesive layer is related to embossing. As a result, it was found that, when the adhesive has a specific hardness, the warpage of the card after embossing is not more than 2 mm.

The present inventors have made further studies based on finding that hardness properties of an adhesive can be specified by the breaking strength and the elongation at break of the adhesive as measured in the form of a film and, as a result, have noted that, by taking into consideration the kind and performance of an adhesive, even an optical card can be successfully embossed when the adhesive used has a breaking strength of not less than 50 kg/cm$^2$ and an elongation at break of not more than 600%.

Furthermore, according to finding of the present inventors, the adhesive having such strength is preferably a reactive hot melt adhesive which, after coating, can react with water in the adherend or water in the air to form a crosslinked structure. In the present invention, a moisture-curable polyurethane which gives adhesiveness at a relatively low temperature is particularly suitable.

The present invention has been made based on the above finding, and the optical card of the present invention comprises: a card substrate; an adhesive layer provided on one surface of said card substrate; an optical recording material layer provided on the surface of said adhesive layer; and a transparent protective layer optionally provided on the surface of said optical recording material layer, said optical recording material layer having an emboss area, to be embossed, provided in other areas than an optical recording section of the optical recording material layer, said adhesive layer being formed of an adhesive having, as measured in the form of a film, a breaking strength of not less than 50 kg/cm$^2$ and an elongation at break of not more than 600%.

BRIEF DESCRIPTION OF THE DRAWINGS

FIGS. 2A and 2B to FIGS. 27A and 27B are plan views illustrating layouts (top side and back side) of recording section of the optical card according to the present invention.

BEST MODE FOR CARRYING OUT THE INVENTION

Figure 1:
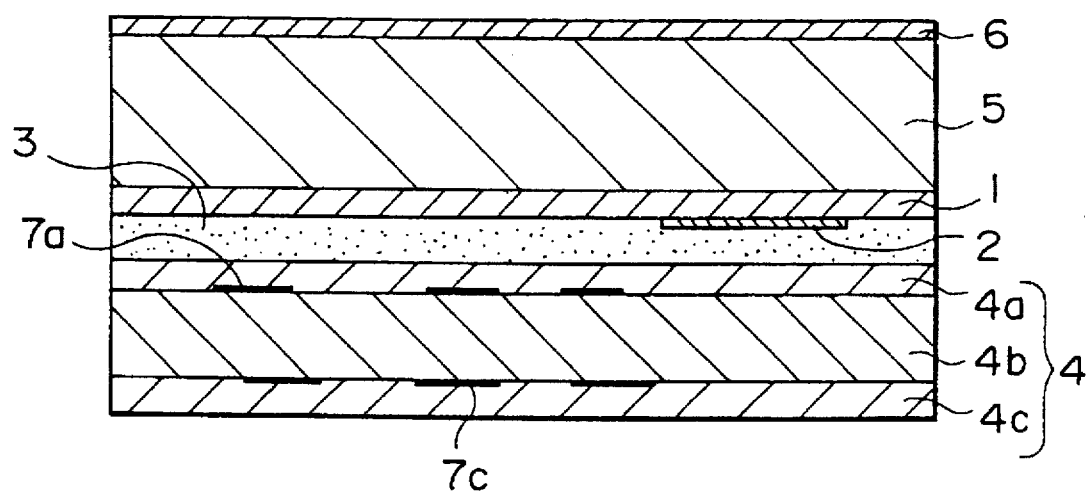
FIG. 1 is a cross-sectional view of an embodiment of an optical card according to the present invention.
Figure 2A:
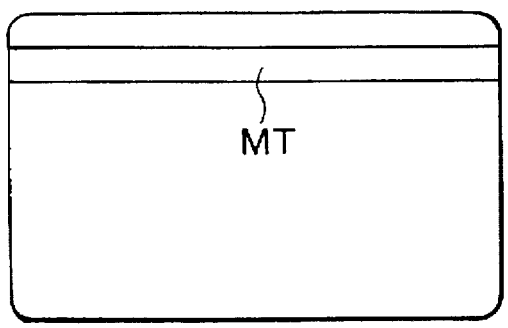
Figure 2B:
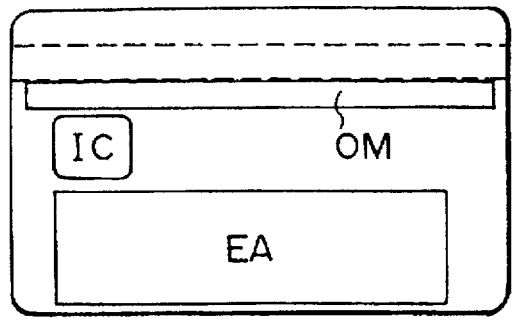
Figure 3A:
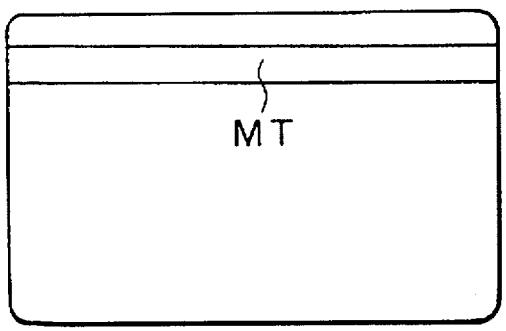
Figure 3B:
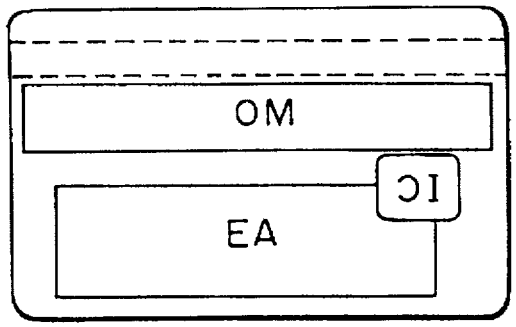
Figure 4A:
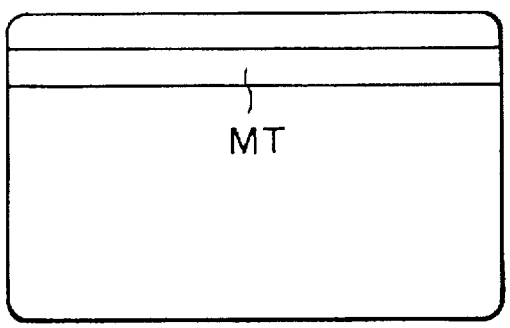
Figure 4B:
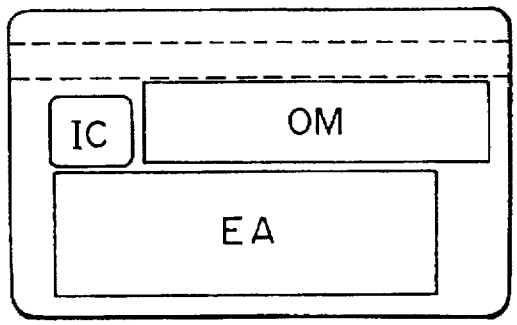
Figure 17A:
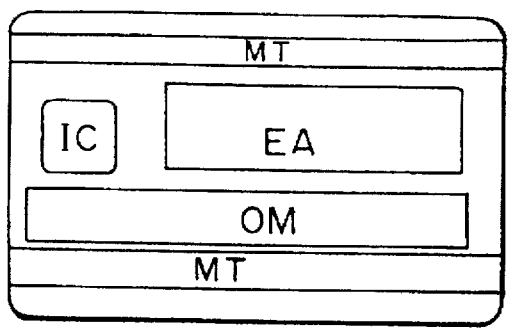
Figure 17B:
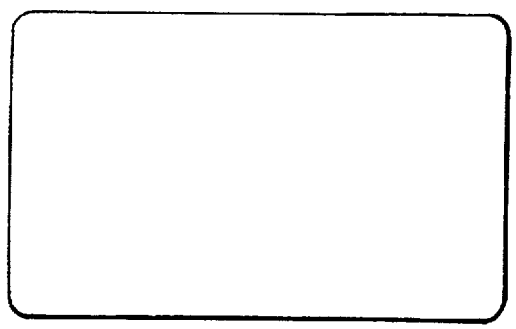
Figure 18A:
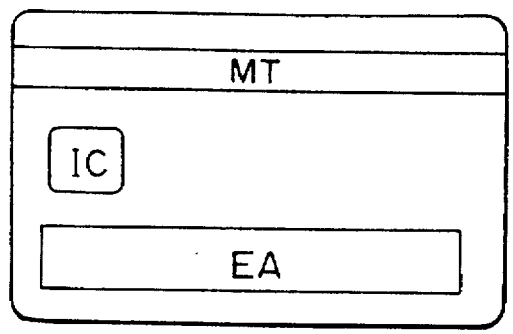
Figure 18B:
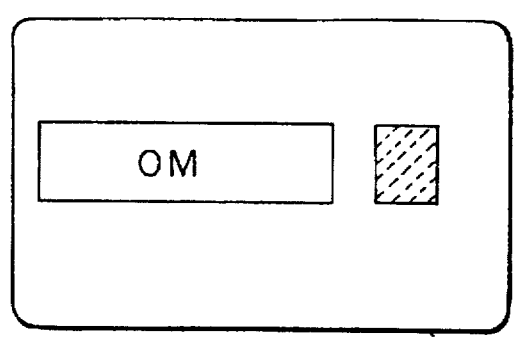
Figure 19A:
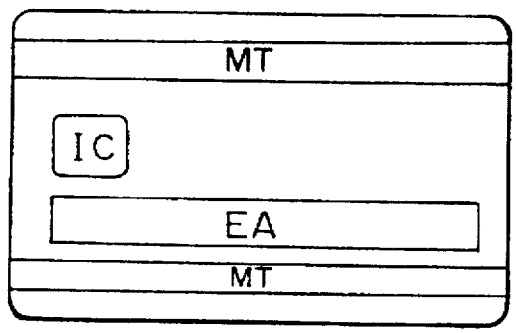
Figure 19B:
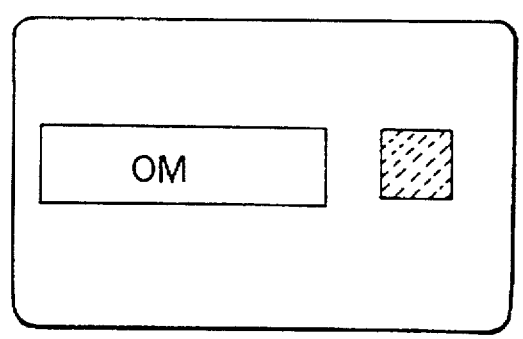
Figure 26A:
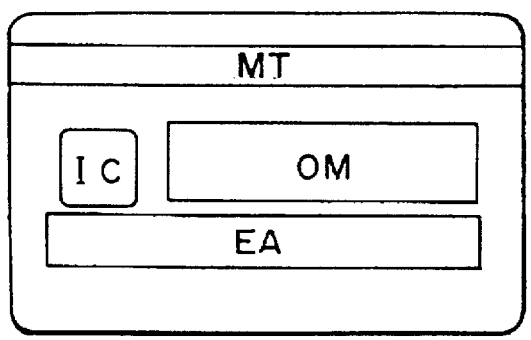
Figure 26B:
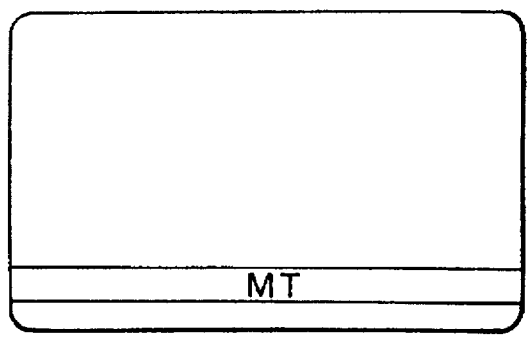
Figure 27A:
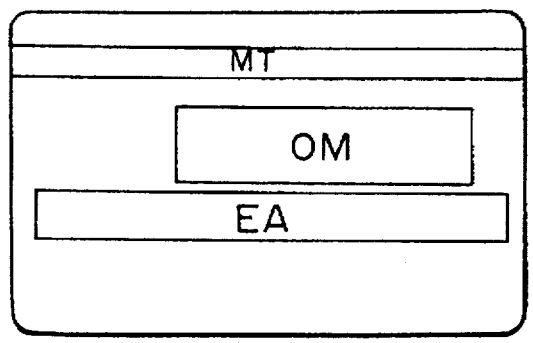
Figure 27B:
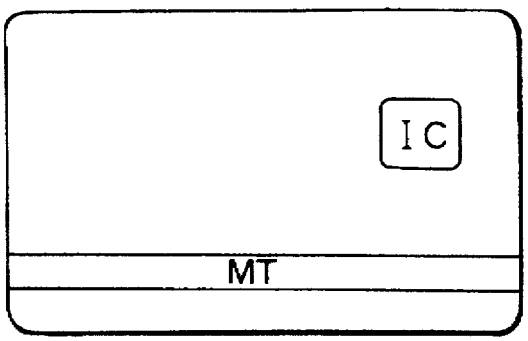
Figure 28:
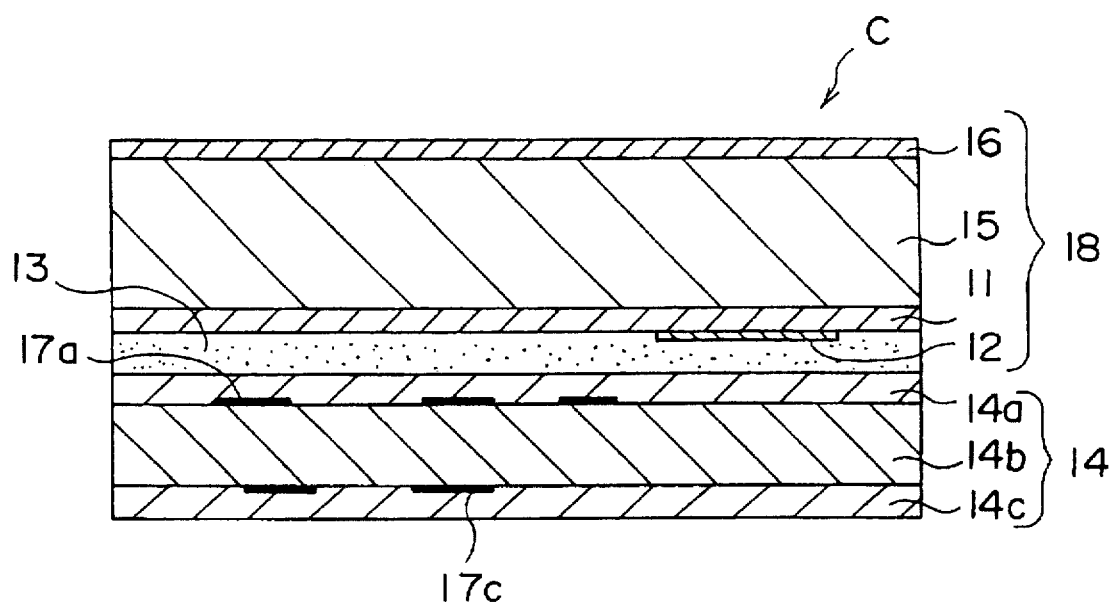
FIG. 28 is an cross-sectional view of an embodiment of the conventional optical card.

As shown in FIG. 1, the optical card according to the present invention, which has been made based on the above finding, comprises: a card substrate 4; an adhesive layer 3 provided on one surface of the card substrate 4; an optical recording material layer 3 provided on the surface of the adhesive layer 3; and a transparent protective layer 5 optionally provided on the surface of the optical recording material layer, the optical recording material layer 3 having an emboss area (not shown), to be embossed, provided in other areas than an optical recording section of the optical recording material layer 3, the adhesive layer 3 being formed of an adhesive having, as measured in the form of a film, a breaking strength of not less than 50 kg/cm$^2$ and an elongation at break of not more than 600%.

In the embodiment shown in FIG. 1, the card substrate 4 may have, for example, a three-layer structure of a laminate of a transparent oversheet 4a formed of polyvinyl chloride, an opalescent core sheet 4b formed of polyvinyl chloride, and a transparent oversheet 4c formed of polyvinyl chloride. Print layers 7a and 7c may be provided on respective both sides of the core sheet 4b. Further, a light-permeable pattern layer 1 and a surface hardening layer 6 may be provided on respective both sides of the transparent protective layer 5. In the optical card according to the present invention, materials used in the conventional optical card may be suitably used except for those for the adhesive layer.

The present invention will now be described in more detail.

The optical recording material layer may be formed of a metallic optical recording material commonly used in the art, such as tellurium-base or bismuth-base material, or an optical recording material of a dye, such as phthalocyanine or naphthoquinone. Further, it may be of write-once, read-many type or ROM type.

The material for the transparent protective layer should be, of course, less likely to cause birefrigence. In addition, it should be noted that the use of a low-molecular weight material causes cracking due to the pressure applied during embossing, and, hence, the material should have a molecular weight high enough not to cause cracking. Specific examples of such suitable materials include polycarbonate (PC), polymethyl methacrylate (PMMA), acrylonitrile/ styrene copolymer (AS), cellulose propionate (CP), cellulose acetate butyrate (CAB), polyvinyl chloride (PVC), and polyesters. Among them, a polycarbonate (PC) having a molecular weight of not less than 25000 is suitable.

The surface hardening layer provided on the transparent protective layer is preferably formed of an acrylic UV hardening coat agent. In addition, melamine, silicone, and other hard coat agents may be used. The surface hardening layer is preferably such that the suitability for temperature and moisture conditions is good, the hardness is high and no crack is created by bending.

The pattern layer provided between the optical recording material layer and the transparent protective layer may be generally formed by a known method such as 2P, injection, or casting method. In this case, when the pattern is formed by the 2P method, a UV curing resin is used, while when the pattern is formed by the injection or casting method, the resin used is the same as that constituting the transparent protective layer. The use of the injection or casting method eliminates the interface of the pattern and the transparent protective layer.

The card substrate is preferably formed of polyvinyl chloride by virtue of its excellent suitability for embossing. In this case, the suitability for embossing becomes better with increasing the proportion of the thickness of polyvinyl chloride in the form of a card to the thickness of the whole card.

The card substrate can have any layer construction, for example, a three-layer structure of 0.05/0.20/0.05 mm, 0.05/ 0.24/0.05 mm, 0.05/0.26/0.05 mm, 0.05/0.30/0.05 mm, or the like, a two-layer structure of 0.20/0.10 mm, 0.24/0.10 mm, 0.26/0.10 mm, 0.30/0.10 mm, or the like, or a single layer structure of 0.30 mm, 0.34 mm, 0.36 mm, or 0.40 mm. 0.10 mm-thick and 0.05 mm-thick layers of polyvinyl chloride are transparent, and not less than 0.20 mm-thick layers of polyvinyl chloride are opalescent. In order to enhance the abrasion resistance of the print, a two-layer or three-layer structure is preferred wherein printing is carried out on an opalescent polyvinyl chloride and a transparent polyvinyl chloride is heat-sealed thereto. Polyesters, polycarbonates (PC), and the like may also be used with those having an excellent suitability for embossing being preferred.

The adhesive layer can be formed of any conventional adhesive such as urethane, epoxy, acrylic, vinyl, or amide adhesive. When neither a sensitizing layer nor a transparent protective layer described below is used, the adhesive layer is applied directly to the optical recording material layer. In this case, the adhesive layer should be formed of an adhesive which provides good recording sensitivity and suitability for temperature and moisture conditions.

Further, in the present invention, the adhesive should have an excellent suitability for embossing. More specifically, as described above, the adhesive used should have, as measured in the form of a film, a breaking strength of not less than 50 kg/cm$^2$ and an elongation at break of not more than 600%. The warpage of the emboss is related to the hardness of the adhesive, and the hardness should be at least 30 kg/cm$^2$ in terms of the breaking strength. In order to provide stable properties, however, the breaking strength should be not less than 50 kg/cm$^2$, still preferably not less than 100 kg/cm$^2$.

The adhesive should satisfy, in addition to the above breaking strength requirement, the requirement for elongation at break which should be not more than 700%. However, in order to provide stable properties, the elongation at break should be not more than 600%.

The thickness of the adhesive layer is preferably in the range of 5 to 200 μm, still preferably about 10 to 100 μm from the viewpoint of good adhesive force and prevention of delamination.

The adhesive is coated on the card substrate or the pattern layer by gravure coating, spin coating, knife coating, silk screen coating, T-die coating, Mayer bar coating, or other coating methods, and the card substrate and the pattern layer are laminated on top of the other through the optical recording material layer. The lamination may be carried out by roll press, flat press, hot roll press, hot flat press, or the like. If an adhesive not satisfying the above requirements is used, there is a possibility that a warpage of not less than 2 mm in terms of the total warpage of the adhesive layer and the card substrate is created during embossing. This raises a problem when the plastic card has a magnetic stripe or an IC chip. In addition, the above warpage and distortion makes it impossible to carry out recording and reproduction in the optical recording section.

When the recording sensitivity of the optical recording material layer is low, a sensitizing layer is, in some cases, formed between the optical recording material layer and the adhesive layer. The provision of the sensitizing layer is not necessary when the recording sensitivity is satisfactory.

The adhesive layer is in contact with the optical recording layer, and when the adhesive deteriorates the recording sensitivity of the optical recording section, a transparent protective layer can be provided from the viewpoint of avoiding such an unfavorable phenomenon. When the sensitizing layer is provided, the transparent protective layer can be formed between the sensitizing layer and the adhesive layer. It is also possible for the transparent protective layer to serve also as the sensitizing layer. However, the provision of the transparent protective layer is not necessary when an adhesive material which causes no deterioration in recording sensitivity of the optical recording section is selected.

The optical card of the present invention may be additionally provided with, besides the optical recording section and the emboss area, an IC module and/or a magnetic tape.

FIGS. 2 to 27 show embodiments of a layout of an optical card with an IC module (IC recording section) and/or a magnetic tape (magnetic recording section) being additionally provided. In each of the drawings, A and B represent respective sides opposite to each other. Further, in the drawings, OM represents an optical recording section, EA an emboss area, IC an IC module, and MT a magnetic tape. The direction of the letter "IC" corresponds to the direction of the IC module. Among the optical cards shown in FIGS. 2 to 27, those shown in FIGS. 2 to 5 are such that no optical recording section is provided on the back side of the magnetic tape. If necessary, the magnetic tape may be provided on both sides (at a position indicated by a dotted line in the drawings).

When IC and the optical recording face are present on different sides, the transparent protective layer is present on the back side of IC. In this case, the back side of the IC is seen through the transparent protective layer. This is unfavorable from the viewpoint of design because the appearance of the card is poor. It is also possible to render the back side of the IC unseen by a method such as provision of a concealing layer.

Specific examples of the method include (1) printing on an IC chip, (2) coloring of an adhesive for fixing IC, (3) formation of a concealing layer between IC and the transparent protective layer or filling of a concealing member between IC and the transparent protective layer, (4) formation of a concealing layer on the surface hardening layer, (5) formation of a concealing layer between the surface hardening layer and the transparent protective layer, and (6) machining of the surface hardening layer to form a concealing layer.

The present invention will now be described in more detail with reference to the following examples.

EXAMPLE 1

At the outset, a hard coat agent (UH-001, manufactured by Toray Industries, Inc.) was spin-coated on one side of a 0.4 mm-thick sheet of polycarbonate (molecular weight: 25000) to form a surface hardening layer. Then, a guide track pattern was formed on the other side of the polycarbonate sheet by a 2P process, and TeOx was sputtered thereon to form an optical recording material layer. Separately, printing was carried out by silk offset printing on both sides of a 0.26 mm-thick opalescent core sheet of polyvinyl chloride, and the core sheet was then sandwiched between two 0.05 mm-thick oversheets. The assembly was subjected to heat sealing to prepare a card substrate having a three-layer structure. In this case, a 650-oersted magnetic tape was previously formed on one side of the oversheet. The polyvinyl chloride and the polycarbonate were bonded to each other with any one of adhesives (1) to (6) listed in Table 1, thereby preparing samples. More specifically, the adhesive was coated on the polyvinyl chloride using a T-die, and the coated polyvinyl chloride was laminated onto the polycarbonate by means of a hot laminator.

EXAMPLE 2

A 0.4 mm-thick polycarbonate (molecular weight: 25000) having a pattern was prepared by casting. Then, a hard coat agent (UH-001, manufactured by Toray Industries, Inc.) was spin-coated on the surface of the polycarbonate remote from the pattern to form a surface hardening layer. TeOx was then sputtered on the patterned surface to form an optical recording material layer. Separately, printing was carried out by silk offset printing on both sides of a 0.26 mm-thick opalescent core sheet of polyvinyl chloride, and the core sheet was heat-sealed to a 0.1 mm-thick oversheet on which a 650-oersted magnetic tape was previously formed, thereby preparing a card substrate having a two-layer structure. The polyvinyl chloride and the polycarbonate were bonded to each other with adhesives (1) to (6) listed in Table 1, thereby preparing samples. More specifically, the adhesive in a melted state was dropped on the polyvinyl chloride, and the polyvinyl chloride was then laminated onto the polycarbonate by hot flat pressing.

EXAMPLE 3

A counter sink having a predetermined size was formed in the optical cards prepared in Examples 1 and 2, and an IC module was mounted therein to prepare other samples.

The samples prepared in Examples 1 to 3 were embossed in two rows by means of an embosser (DC-4600, manufactured by Data card Japan, Ltd.). The warpage of the cards after embossing was measured and found to be not more than 2 mm for all the cards. Further, no cracking was observed in the transparent protective layer.

Further, for each of the above samples, 100 tracks of data was written using an optical card R/W (3B3H-DJ-01, manufactured by Omuron Corp.), and 1000 passes were carried out with magnetic R/W (MCT-141, manufactured by Sankyo Seiki Mfg. Co., Ltd.). Thereafter, previously written data were read, and 100 tracks of data were newly written and then read. As a result, it was found that, for all the cards, the error rate of optical recording was not more than $1 \times 10^{-4}$ and no deterioration of magnetic R/W derived from damage caused during carrying was observed. Further, the samples were allowed to stand for 1000 hr under conditions of a temperature of 60° C. and a humidity of 90%. As a result, the stability against change in performance with the elapse of time was good, that is, the error rate remained unchanged and was not more than $1 \times 10^{-4}$.

TABLE 1

| | Adhesive | Breaking strength (kg/cm²) | Elongation at break (%) |
|---|---|---|---|
| 1 | Bondmaster 70-7310 (reactive HM), manufactured by Kanebo NSC | 150 | 550 |
| 2 | Bondmaster 70-7254 (reactive HM), manufactured by Kanebo NSC | 160 | 500 |
| 3 | Bondmaster 70-7141 (reactive HM), manufactured by Kanebo NSC | 130 | 580 |
| 4 | Aronmighty RX-3010 (reactive HM), manufactured by Toa Gosei Chemical Industry Co., Ltd. | 300 | 450 |
| 5 | Aronmighty RX-3030 (reactive HM), manufactured by Toa Gosei Chemical Industry Co., Ltd. | 350 | 450 |
| 6 | Esdine #9607 (reactive HM), manufactured by Sekisui Chemical Co., Ltd. | 55 | 300 |

COMPARATIVE EXAMPLE

Samples were prepared in the same manner as in Examples 1 to 3, except that adhesives (1) to (5) listed in Table 2 were used. They were then embossed. This caused a warpage of not less than 2 mm for all the samples. When a polycarbonate having a molecular weight of 15000 was used as a transparent protective layer, embossing resulted in cracking of the transparent protective layer in all the cases where the adhesives listed in Tables 1 and 2 were used.

TABLE 2

| | Adhesive | Breaking strength (kg/cm$^2$) | Elongation at break (%) |
|---|---|---|---|
| 1 | Aronmelt PPET-2001 (ordinary type HM), manufactured by Toa Gosei Chemical Industry Co., Ltd. | 22 | 860 |
| 2 | Kemit Urethane TU-4001C (two-pack cold cure type), manufactured by Toray Industries, Inc. | 24 | 350 |
| 3 | Kemit Urethane TU-4210C (two-pack cold cure type), manufactured by Toray Industries, Inc. | 20 | 350 |
| 4 | Super-X No. 8008 (one-pack cold cure type), manufactured by Cemedine Co., Ltd. | 20 | 215 |

As described above, the optical cards of the present invention, by virtue of use of an adhesive layer having high breaking strength and low elongation at break, can be embossed without significant warpage of the cards. Further, the use of a polycarbonate having a high molecular weight as the transparent protective layer causes no crack of the optical card.

I claim:

1. An optical card comprising:
   a card substrate;
   an adhesive layer provided on one surface of said card substrate, said adhesive layer comprising an adhesive having, as measured in the form of a film, a breaking strength of not less than 50 kg/cm$^2$ and an elongation at break of not more than 600%;
   an optical recording material layer provided on the surface of said adhesive layer, said optical recording material layer having an emboss area, to be embossed, provided in areas other than an optical recording section of said optical recording material layer; and
   a transparent protective layer optionally provided on the surface of said optical recording material layer.

2. The optical card according to claim 1, wherein said adhesive comprises a reactive hot melt adhesive.

3. The optical card according to claim 1, wherein said adhesive comprises a reactive urethane hot melt adhesive.

4. The optical card according to claim 1, wherein said transparent protective layer comprises a polycarbonate having a molecular weight of not less than 25000.

5. The optical card according to claim 1, further comprising at least one of an IC module constituting an IC recording section and a magnetic recording layer constituting a magnetic recording section.

6. The optical card according to claim 5, wherein the optical recording section, the IC recording section, and the magnetic recording section are provided on the same side of the card.

7. The optical card according to claim 5, wherein the optical recording section and the IC recording section are provided on the same side of the card and the magnetic recording section is provided on the opposite side of the card.

8. The optical card according to claim 5, wherein the optical recording section and the magnetic recording section are provided on the same side of the card and the IC recording section is provided on the opposite side of the card.

9. The optical card according to claim 5, wherein the magnetic recording section and the IC recording section are provided on the same side of the card and the optical recording section alone is provided on the opposite side of the card.

10. The optical card according to claim 5, wherein the magnetic recording section is provided on both sides of the card and the IC recording section and the optical recording section are provided on the same side of the card.

11. The optical card according to claim 5, wherein the magnetic recording section is provided on both sides of the card and the IC recording section is provided on the side where the optical recording section is not provided.

12. The optical card according to claim 5, wherein two magnetic recording sections are provided on the same side of the card.

13. The optical card according to claim 5, wherein the IC recording section and the optical recording section are provided respectively on different sides of the card and concealing means is provided on the back side of IC module of the IC recording section.

14. The optical card according to claim 5, wherein the optical recording section is provided at a position where a magnetic head does not come into contact therewith during recording or reproduction in the magnetic recording section.

15. The optical card according to claim 1, produced by integrally bonding an optical recording member, having an optical recording material layer, provided on one side of a transparent protective layer to a card substrate as a support through an adhesive layer.

16. An optical card comprising:
    a card substrate;
    a reactive hot melt adhesive layer provided on one side of said card substrate, the reactive hot melt adhesive layer comprising a moisture-curable adhesive;
    an optical recording material layer provided on the surface of said adhesive layer; and
    a transparent protective layer optionally provided on the surface of said optical recording material layer.

17. The optical card according to claim 16, wherein said adhesive comprises a reactive urethane hot melt adhesive.

18. The optical card according to claim 16, produced by integrally bonding an optical recording member, having an optical recording material layer, provided on one side of a transparent protective layer to a card substrate as a support through an adhesive layer.

* * * * *